Patented Jan. 19, 1937

2,067,946

UNITED STATES PATENT OFFICE 2,067,946

PROCESS OF MAKING CELLULOSE DERIVATIVES

Norman Picton, Stevenston, Scotland, assignor to Imperial Chemical Industries Limited, a corporation of Great Britain No Drawing. Application June 19, 1935, Serial No. 27,386

11 Claims. (Cl. 260—152)

This invention relates to an improved process for the manufacture of cellulose ethers, particularly ethyl cellulose, of a quality not heretofore obtainable by the prior art process.

In the manufacture of cellulose ethers by the action of alkyl or aralkyl halides, particularly ethyl chloride, on cellulose in the presence of concentrated caustic alkali solution, the methods commonly used may be classified under two general processes. In the first method, the cellulose is first steeped in an excess of concentrated caustic alkali solution and the excess liquid removed by pressing or by evaporation. The mass is then broken up, or if, as is preferably the case, the cellulose is in the form of sheets normally known as pulp board, the sheets of alkali cellulose are disintegrated in a shredding machine. The shredded alkali cellulose is then placed in the reaction vessel together with the ethyl chloride or other alkyl or aralkyl chloride, frequently an additional quantity of solid caustic alkali, and usually a diluent such as benzene or toluene, and the mixture heated and stirred until etherification occurs. In the second general method, the cellulose, alkali, water, etherifying agent and diluent, such as toluene, are added directly to the reaction vessel and heated to the reaction temperature while vigorously agitated. This method is intended to simplify the procedure and to avoid the exposure of alkali cellulose to air which is inherent in the steeping and shredding operation.

In carrying out the reaction in' this simplified manner the uniformity of the reaction is poor compared with that of the more complicated method which involves previous preparation of alkali cellulose. It is customary to use cellulose either in the form of cotton linters or wood pulp in a fluffed condition, which makes it extremely difficult to effect an intimate mixture of this bulky cellulose with other ingredients of the reaction mixture. One method devised to avoid this difficulty involves the grinding of the cellulose and stirring the ground product into a slurry of caustic alkali in an inert diluent. The resulting intimate cellulose and alkali mixture is then treated with water and etherifying agent. A second such method involves grinding the cellulose with the solid alkali prior to etherification.

I have now discovered that the expensive grinding operation with the possible accompanying injury to the cellulose can be avoided and all the advantages of the simplified process retained, together with much greater uniformity of etherification and consequent improvement in the quality of the product by using forms of cellulose containing a multiplicity of fibers that I call "granulated cellulose". This cellulose consists of granules characterized by (1) certain dimensions or volume; (2) certain degree of compactness; and (3) certain apparent bulk density. Granules of the desired characteristics may be obtained by cutting pulp board of a degree of compactness of 80 and a thickness of $\frac{1}{16}''$ into $\frac{1}{8}''$ squares, thus forming granules $\frac{1}{8}'' \times \frac{1}{8}'' \times \frac{1}{16}''$ with an apparent bulk density of about 16 pounds per cubic foot. Granules of this general type are hereafter referred to as granulated pulp board. The degree of compactness is expressed in the customary way used in the paper trade, as the ratio of the weight in pounds of 415,000 square inches of board to 100 times the thickness in inches. Obviously, the compactness might be expressed in other ways. However, all values of this characteristic given herein have been calculated by the foregoing customary method. The apparent bulk density is obtained by determining the weight of the granules held by a container of known capacity. The present invention is not limited to the more or less regular granules obtained by cutting pulp board, but includes granules produced in other ways. For example, suitable granules may be made by shredding or passing thru a disintegration mill the pulp while wet and containing about 40–70% bone dry cellulose, and then, with or without screening, drying the disintegrated pulp. Produced by such a method, the granules are of irregular shapes but they possess the required compactness and apparent bulk density. Granulated cellulose meeting the requirements of the present invention may be produced also by pelleting or according to other methods.

The degree of compactness of granulated cellulose may be varied. I prefer to use granules of a compactness not less than 40 and preferably 50–115, calculated as described previously. Less satisfactory results are obtained using granulated cellulose of a compactness above 125. With reference to the size of granules, I prefer to use, in the case of granulated pulp board, squares not appreciably larger than $\frac{1}{2}''$ square, nor smaller than $\frac{1}{16}'' \times \frac{1}{16}''$ inches. The thickness of the squares may be varied but I may use boards within the limits of 0.02''–0.15'' thickness. I find a thickness of $\frac{1}{16}''$ to be very satisfactory. In the case of irregular granules prepared, for example, from moist pulp, the size should be such that the volume of the individual granules will not exceed appreciably 0.05 cubic inch. The apparent bulk density of the granulated cellulose when packed under its own weight should not be less than 8 pounds per cubic foot. The bulk density will vary with the compactness and the dimensions. Material of bulk density as high as 20 may be used. From the foregoing description it is obvious that the granulated cellulose is quite different from cotton cellulose, cotton linters, or fluffed wood pulp which are used in the prior art process for the manufacture of cellulose ethers.

I have found that cellulose ethers of improved quality may be produced by adding such granulated cellulose directly into the reaction vessel with the caustic alkali, water, etherifying agent, and diluent, and then agitating and heating until etherification occurs. Inert organic liquids generally may be used as diluents including benzene, toluene, xylene, chlorobenzene, ethylbenzene, dibutyl ether, dipropyl ether, dioxane, diisopropyl ether, Hi-flash naphtha, and diethyl ether. Operation in this manner has a number of advantages over the prior art methods. With reference to the alkali cellulose process involving steeping and shredding, I avoid the oxidation of cellulose occurring during the shredding of alkali cellulose. Furthermore, I avoid the tendency of the cellulose to form a certain amount of hard nodules in the shredding operation, which are extremely difficult to ethylate satisfactorily. The difficulty in ethylating such nodules is one of the factors contributing to the poor quality of cellulose ether films prepared from products manufactured according to this prior art method. Altho the granulated cellulose is compact and therefore easily mixed with the other ingredients, nevertheless it disintegrates readily in the reaction mass due to the felted arrangement of fibers (in contrast to the knotted arrangement of fibers in nodules of alkali cellulose) and reacts readily and uniformly with the etherfying agent in the presence of caustic alkali. With reference to those prior art methods in which the cellulose in bulky form is added directly with the other ingredients to the reaction vessel, the granulated cellulose, in contrast to the bulky cotton linters or fluffed wood pulp, may be readily and intimately mixed with the other ingredients of the reaction mixture. With the dense granulated cellulose, also, there is much less tendency for the cellulose to be oxidized during etherification as the diluent and etherifying agent protect it from the air. As a result of these factors, cellulose ethers produced from granulated cellulose are superior to the prior art products as regards color, clarity, uniformity of solubility and many other qualities. The following example illustrates my improved process for the manufacture of cellulose ethers.

Example

One hundred parts of granulated cellulose obtained by cutting pulp board, having a compactness of 90, granule dimensions of $\frac{1}{8}'' \times \frac{1}{16}'' \times \frac{1}{16}''$, and an apparent bulk density of 15 pounds per cubic foot are charged into an autoclave with 240 parts of solid caustic soda, 120 parts of water, 500 parts of benzene, and 300 parts of ethyl chloride. The mixture is agitated, gradually heated to 150° C. and maintained at this temperature for 8 hours. The resulting ethyl cellulose is isolated and purified by the known methods. The product is completely soluble in toluene-alcohol and in a number of other solvents. Films produced from this material are characterized by a high degree of clarity, substantial absence of color, and a high degree of toughness.

The invention is not limited to the foregoing example, but includes many modifications of the described procedure. The granulated cellulose may be prepared from cotton linters, cotton hull fiber, wood pulps of various kinds, and cellulose from various sources such as bagasse, straw, bamboo, etc. Modified cellulose, such as oxycellulose and hydrocellulose or the like may be used. Also, the granulated forms of fibrous low-substituted cellulose derivatives, such as low methylated or low ethylated cellulose, low-substituted glycol cellulose, or the like may be used as starting material. The granulated cellulose may be prepared from cellulose pretreated in various ways, such as pretreatment with acids such as formic, nitric or sulfuric. I prefer to use the granulated cellulose in the form of granulated pulp board.

I do not limit myself to any order of adding the ingredients, nor to the use of water, nor of an inert diluent, though both are preferred. Moreover, the advantages of granulated pulp board may be obtained, in some measure, in the more complicated process which involves previous intimate mixture of the cellulose with a caustic solution with or without the removal of the excess liquor. The concentration of the various ingredients may be varied and the conditions of time and temperature, which are determined in part by the nature of the etherifying agent, may be varied considerably. The caustic soda illustrated in the example is merely representative of the caustic alkalies which are in general applicable. The isolation and purification of the cellulose ether may be carried out by the methods commonly known to the cellulose ether art.

In place of ethyl chloride, ethyl bromide, ethyl sulfate, ethyl paratoluenesulfonate, or other ethylating agents may be used. Other cellulose ethers besides ethyl cellulose may be produced by using suitable etherifying agents. Examples of such ethers are methyl cellulose, propyl cellulose, ethyl methyl cellulose, butyl ethyl cellulose, ethyl lauryl cellulose, benzyl cellulose, glycol cellulose, cellulose glycolic acid, and the like, prepared by the use of one or, for mixed ethers, a plurality of etherifying agents such as methyl sulfate, propyl chloride, butyl chloride, ethylene chlorohydrin, sodium chloroacetate, benzyl chloride, lauryl chloride, etc.

The above description and example are intended to be illustrative only. Any modification of or variation therefrom which conforms to the spirit of the invention is intended to be included within the scope of the claims.

I claim:

1. The process of preparing ethyl cellulose, which comprises reacting one hundred parts of granulated cellulose having a compactness of about 90, granule dimensions of about $\frac{1}{8} \times \frac{1}{16} \times \frac{1}{16}$ inch, and an apparent bulk density of about 15 pounds per cubic foot with about 300 parts of ethyl chloride in the presence of about 240 parts of solid caustic soda, 120 parts of water, and 500 parts of benzene at a temperature of about 150° C. during about 8 hours, and isolating and purifying the resulting ethyl cellulose.

2. The process of preparing ethyl cellulose, which comprises reacting granulated cellulose having a compactness of about 90, granule dimensions of about $\frac{1}{8} \times \frac{1}{16} \times \frac{1}{16}$ inch, and an apparent bulk density of about 15 pounds per cubic foot with ethyl chloride in the presence of caustic soda, water, and benzene.

3. The process of preparing ethyl cellulose, which comprises reacting granulated cellulose having a compactness of about 50 to 115, granule dimensions of at least about 1/16 x 1/16 x .02 inch, and an apparent bulk density of at least about 8 pounds per cubic foot with ethyl chloride in the presence of caustic soda, water, and benzene.

4. Process of preparing ethyl cellulose, which comprises heating granulated cellulose having a compactness of at least 40, an individual granule volume not exceeding 0.05 cubic inch, and an apparent bulk density of at least 8 pounds per cubic foot with an ethylating agent in the presence of caustic alkali, water, and an inert diluent until etherification of the cellulose has taken place, and recovering the ethyl cellulose from the reaction mixture.

5. Process of preparing cellulose ethers, which comprises heating granulated cellulose having a compactness of at least 40, an apparent bulk density of at least 8 pounds per cubic foot, and an individual granule volume not exceeding 0.05 cubic inch with an etherifying agent in the presence of caustic alkali, water, and an inert diluent until etherification has taken place, and recovering the cellulose ether from the reaction mixture.

6. Process of preparing cellulose ethers, which comprises heating granulated cellulose having a compactness of at least 40, an apparent bulk density of at least 8 pounds per cubic foot, and an individual granule volume not exceeding 0.05 cubic inch with an etherifying agent in the presence of caustic alkali and water, until etherification has taken place, and recovering the cellulose ether from the reaction mixture.

7. Process of preparing cellulose ethers, which comprises heating granulated cellulose having a compactness of at least 40, an apparent bulk density of at least 8 pounds per cubic foot, and an individual granule volume not exceeding 0.05 cubic inch with an etherifying agent in the presence of caustic alkali and an inert diluent until etherification has taken place, and recovering the cellulose ether from the reaction mixture.

8. Process of preparing cellulose ethers, which comprises heating granulated cellulose having a compactness of at least 40, an apparent bulk density of at least 8 pounds per cubic foot, and an individual granule volume not exceeding 0.05 cubic inch with an etherifying agent in the presence of caustic alkali until etherification has taken place, and recovering the cellulose ether from the reaction mixture.

9. Process of preparing cellulose ethers, which comprises heating granulated cellulose with an etherifying agent in the presence of caustic alkali and an inert diluent until etherification has taken place, and recovering the cellulose ether from the reaction mixture.

10. Process of claim 9 in which the granulated cellulose is prepared by cutting pulp board of a compactness of not less than 40 into squares not greater than 1/2" square and not over 0.05 cubic inch in apparent volume, and not less than an apparent bulk density of 8 pounds per cubic foot.

11. Process of claim 9 in which is used granulated pulp board obtained by cutting commercial pulp board into squares not greater than 1/2" square.

NORMAN PICTON.